United States Patent Office 3,395,144
Patented July 30, 1968

3,395,144
HYDRAZONES OF 1-AMINO-3,3-DIPHENYL-
PYRROLIDINES
John W. Cusic, Skokie, and Peter Yonan, Chicago, Ill., assignors to G. D. Searle & Co., Chicago, Ill., a corporation of Delaware
No Drawing. Filed Dec. 29, 1964, Ser. No. 422,016
6 Claims. (Cl. 260—240)

ABSTRACT OF THE DISCLOSURE

Hydrazones obtained by the reaction of aromatic and heterocyclic aldehydes with 1-amino-3,3-diphenylpyrrolidines and possessing anti-ulcer activity are described herein.

The present invention relates to a group of compounds which are hydrazone derivatives of 1-amino-3,3-diphenylpyrrolidines. More particularly, it relates to a group of compounds having the following general formula

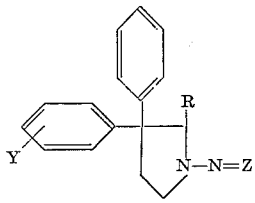

wherein Y is hydrogen, methyl, or halogen; R is selected from the group consisting of hydrogen and lower alkyl; and Z is selected from the group consisting of fluoren-9-ylidene and =CHR' wherein R' is selected from the group consisting of phenyl, tolyl, halophenyl, methoxyphenyl, methylenedioxyphenyl, hydroxyphenyl, pyridyl, and ferrocenyl. The halogen radicals referred to above include fluorine, chlorine, bromine, and iodine. The halophenyl radicals referred to above include fluorophenyl, chlorophenyl, bromophenyl, and iodophenyl.

The compounds of this invention are useful because of their pharmacological properties. In particular, these compounds possess activity as anti-ulcer agents which is demonstrated by their inhibition of ulceration in the Shay rat.

The compounds of this invention are prepared from the appropriate pyrrolidine of the formula

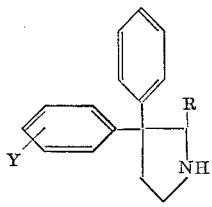

wherein R and Y are defined as above. This compound is nitrosated with sodium nitrite to give the corresponding N-nitroso compound which is then reduced to the corresponding N-amino compound. The reduction can be carried out by means of a combination of metal and acid such as zinc and acetic acid, or by means of a metal hydride reducing agent such as lithium aluminum hydride. The resultant aminopyrrolidine is then condensed with the appropriate aldehyde or ketone in an inert solvent. A trace of acetic acid can be included to catalyze the reaction. Although 2-propanol is a particularly useful solvent for the reaction, ethanol or other alcohols can also be used. In addition, aromatic hydrocarbons such as benzene or toluene are useful as solvents in this type of a reaction although, in this case, it is desirable to remove the water from the reaction mixture as it is formed. The reaction is promoted by the use of elevated temperatures.

The following examples are presented to further illustrate the present invention; they should not be construed as limiting it in spirit or in scope. In these examples, quantities are indicated in parts by weight unless parts by volume are indicated and temperatures in degrees centigrade (° C.). The relationship between parts by weight and parts by volume is the same as that between grams and milliliters.

EXAMPLE 1

A mixture of 75 parts of 3,3-diphenyl-2-ethylpyrrolidine, 190 parts of ethanol, 60 parts of water, and 34 parts of concentrated hydrochloric acid is heated to 70° C. with stirring. A solution of 28 parts of sodium nitrile and 48 parts of water is then added dropwise over a period of one hour. A precipitate appears toward the end of the addition but the mixture is heated for an additional 1.5 hours and then cooled in an ice bath. The mixture is filtered to separate the precipitated solid which is dissolved in 225 parts of benzene and washed with water. The benzene solution is then dried and the solution is concentrated to a small volume by evaporation of the solvent under reduced pressure. The addition of hexane to the solution causes a precipitate to form. This is 3,3-diphenyl-2-ethyl-1-nitrosopyrrolidine melting at about 113–114° C. It has the following formula

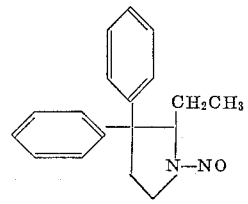

The nitrosation of 3,3-diphenylpyrrolidine and 3,3-diphenyl-2-methylpyrrolidine according to the above procedure gives, respectively, 3,3-diphenyl-1-nitrosopyrrolidine and 3,3-diphenyl-2-methyl-1-nitrosopyrrolidine.

EXAMPLE 2

A mixture is prepared from 15 parts of lithium aluminum hydride and 780 parts of anhydrous ether in an apparatus which has been flushed with dry nitrogen. Then, a solution of 40 parts of 3,3-diphenyl-2-ethyl-1-nitrosopyrrolidine in 210 parts of tetrahydrofuran is added dropwise. The resultant mixture is refluxed for an additional 2 hours before it is cooled in ice and decomposed by the cautious dropwise addition of (1) 25 parts of water in 75 parts of tetrahydrofuran, (2) a solution of 6 parts of sodium hydroxide in 20 parts of water, and finally (3) 55 parts of water. The resultant mixture is filtered and the separated salts are washed with hot tetrahydrofuran. The organic solution is then dried; the solvent is evaporated under reduced pressure to leave a residual oil which is 1-amino-3,3-diphenyl-2-ethyl-pyrrolidine.

Reductioin of 3,3 - diphenyl - 1 - nitrosopyrrolidine in the same way gives 1-amino-3,3-diphenylpyrrolidine while the reduction of 3,3-diphenyl-2-methyl-1-nitrosopyrrolidine gives 1 - amino - 3,3 - diphenyl - 2 - methyl-pyrrolidine.

EXAMPLE 3

8 parts of 1 - amino - 3,3 - diphenyl - 2 - ethylpyrrolidine is dissolved in 65 parts of 2-propanol and then 6 parts of benzaldehyde and 1 drop of glacial acetic acid are added. The resultant mixture is heated for about 5 minutes and then stirred and cooled to cause crystals to form. This solid is separated and recrystallized from ethanol to give 1 - benzylideneamino - 3,3 - diphenyl - 2 - ethylpyrrolidine melting at about 119–120° C. This compound has the following formula

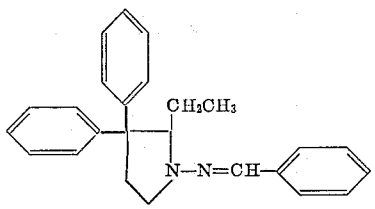

In the same manner, 1 - amino - 3,3 - diphenylpyrrolidine is reacted with benzaldehyde to give 1-benzylideneamino - 3,3 - diphenylpyrrolidine and 1 - amino-3,3 - diphenyl - 2 - methylpyrrolidine is reacted with benzaldehyde to give 1 - benzylideneamino - 3,3 - diphenyl-2-methylpyrrolidine.

EXAMPLE 4

To a solution of 6 parts of 1-amino-3,3-diphenyl-2-ethylpyrrolidine in 48 parts of 2-propanol there is added 3 parts of pyridine-4-carboxaldehyde and 1 drop of acetic acid. The resultant solution is heated on a steam bath for 10 minutes and then a solution of hydrogen chloride in 2-propanol is added. Ether is added to the solution which is then cooled and scratched to initiate crystallization. The solid which forms is separated and recrystallized from a mixture of ethanol and ether to give 1-(4-pyridylmethyleneamino)-3,3-diphenyl-2-ethylpyrrolidine hydrochloride melting at about 260° C. The free base of this compound has the following formula

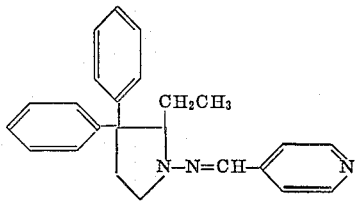

EXAMPLE 5

The procedure of Example 3 is repeated using 3 parts of 1 - amino - 3,3 - diphenyl - 2 - ethylpyrrolidine, 2 parts of ferrocenecarboxaldehyde, 1 part of acetic acid and 50 parts by volume of a 1:1 mixture of 2-propanol and hexane. The resultant crude product is recrystallized from hexane to give 1 - ferrocenylmethyleneamino-3,3-diphenyl-2-ethylpyrrolidine melting at about 152–153° C.

EXAMPLE 6

4 - tolualdehyde, 4 - fluorobenzaldehyde, 3 - chlorobenzaldehyde, 4 - methoxybenzaldehyde, 4 - hydroxybenzaldehyde, and piperonal are each reacted with 1-amino - 3,3 - diphenyl - 2 - ethylpyrrolidine according to the procedure described in Example 3 to give the corresponding hydrazone in each instance.

What is claimed is:
1. A compound of the formula

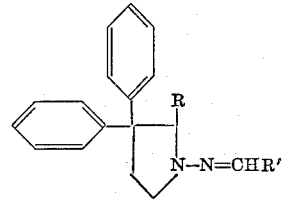

wherein R is selected from the group consisting of hydrogen and lower alkyl and R' is selected from the group consisting of phenyl, tolyl, halophenyl, hydroxyphenyl, methoxyphenyl, methylenedioxyphenyl, pyridyl, and ferrocenyl.

2. A compound of the formula

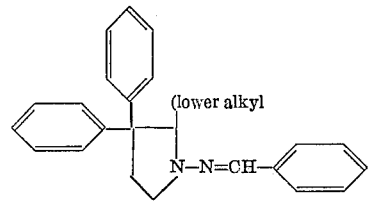

3. 1 - benzylideneamino - 3,3 - diphenyl - 2 - ethylpyrrolidine.
4. 1 - (4 - pyridylmethyleneamino) - 3,3 - diphenyl - 2 - ethylpyrrolidine.
5. 1 - ferrocenylmethyleneamino - 3,3 - diphenyl - 2 - ethylpyrrolidine.
6. 1 - amino - 3,3 - diphenyl - 2 - ethylpyrrolidine.

References Cited

UNITED STATES PATENTS 3,158,609   11/1964   Hamilton et al.   260—240

FOREIGN PATENTS 864,820   4/1961   Great Britain.

OTHER REFERENCES

Chemical Abstracts, vol. 58, col. 4577 (1963) (abstract of Zinner et al.).

JOHN D. RANDOLPH, *Primary Examiner.*

UNITED STATES PATENT OFFICE
CERTIFICATE OF CORRECTION

Patent No. 3,395,144                                        July 30, 1968

John W. Cusic et al.

It is certified that error appears in the above identified patent and that said Letters Patent are hereby corrected as shown below:

Column 2, line 13, "nitrile" should read -- nitrite --.

Signed and sealed this 3rd day of February 1970.

(SEAL)
Attest:

Edward M. Fletcher, Jr.                          WILLIAM E. SCHUYLER, JR.
Attesting Officer                                           Commissioner of Patents